(12) United States Patent
Huang et al.

(10) Patent No.: US 10,437,219 B2
(45) Date of Patent: Oct. 8, 2019

(54) METHOD OF MANAGING ENERGY CONSUMPTION

(71) Applicant: GRAND MATE CO., LTD., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Yen-Jen Yeh, Taichung (TW); Yu-Chin Tsai, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 515 days.

(21) Appl. No.: 14/884,431

(22) Filed: Oct. 15, 2015

(65) Prior Publication Data

US 2017/0010598 A1 Jan. 12, 2017

(30) Foreign Application Priority Data

Jul. 9, 2015 (TW) .............................. 104122338 A

(51) Int. Cl.
*G05B 19/042* (2006.01)
*G05B 15/02* (2006.01)

(52) U.S. Cl.
CPC ......... *G05B 19/0428* (2013.01); *G05B 15/02* (2013.01); *G05B 2219/25387* (2013.01); *G05B 2219/2642* (2013.01)

(58) Field of Classification Search
CPC ........................... G05B 19/0428; G05B 15/02
(Continued)

(56) References Cited

U.S. PATENT DOCUMENTS

2008/0272934 A1* 11/2008 Wang ................. H02J 3/14
340/870.11
2010/0280674 A1* 11/2010 Jalili ..................... G01D 4/002
700/295
(Continued)

FOREIGN PATENT DOCUMENTS

CN 101393451 A 3/2009
CN 103621107 A 3/2014
(Continued)

OTHER PUBLICATIONS

Chase, Jeffrey S., et al. "Managing energy and server resources in hosting centers." ACM SIGOPS operating systems review 35.5 (2001): pp. 103-116.*

(Continued)

*Primary Examiner* — Satish Rampuria
(74) *Attorney, Agent, or Firm* — Tracy M Heims; Apex Juris, pllc.

(57) ABSTRACT

A method of managing energy consumption which is applied to a wireless control system is provided, wherein the wireless control system includes a plurality of appliances and a relay device. The method includes the steps below: first, obtain an amount of energy consumption from a start time point to a predetermined time point in an energy monitoring period; next, compare the amount of energy consumption with a second threshold during the energy monitoring period, which is lower than a first threshold; finally, if the amount of energy consumption exceeds the second threshold, determine whether to start an energy conservation mode; if the energy conservation mode starts, the relay device sends an energy conservation command to at least one of the appliances to control said appliance to consume less energy. Whereby, in the energy conservation mode, the (Continued)

energy consumed by the appliances would be reduced without stopping the energy supply.

6 Claims, 3 Drawing Sheets

(58) Field of Classification Search
USPC .................................................. 700/275–306
See application file for complete search history.

(56) References Cited

U.S. PATENT DOCUMENTS

| | | | | |
|---|---|---|---|---|
| 2011/0055036 | A1* | 3/2011 | Helfan .................. | G06Q 30/04 705/26.1 |
| 2012/0029717 | A1* | 2/2012 | Cox ......................... | H02J 3/14 700/295 |
| 2012/0053739 | A1* | 3/2012 | Brian ..................... | G06F 1/3203 700/287 |
| 2012/0226572 | A1* | 9/2012 | Park ........................ | H02J 3/14 705/26.1 |
| 2012/0316695 | A1* | 12/2012 | Chen ....................... | H02J 3/008 700/296 |
| 2013/0238157 | A1* | 9/2013 | Luke .................. | H02J 13/0006 700/295 |

FOREIGN PATENT DOCUMENTS

| | | |
|---|---|---|
| CN | 103676819 A | 3/2014 |
| TW | 201241630 A | 10/2012 |
| TW | M441805 U | 11/2012 |
| TW | M452554 U | 5/2013 |
| TW | I451096 B | 9/2014 |

OTHER PUBLICATIONS

Niyato, Dusit, Lu Xiao, and Ping Wang. "Machine-to-machine communications for home energy management system in smart grid." IEEE Communications Magazine 49.4 (2011). pp. 53-59.*

Han, Jinsoo, et al. "Green home energy management system through comparison of energy usage between the same kinds of home appliances." Consumer Electronics (ISCE), 2011 IEEE 15th International Symposium on. IEEE, 2011. pp. 1-4.*

Paing, T., et al. "Wirelessly-powered wireless sensor platform." 2007 European Microwave Conference. IEEE, 2007.pp. 999-1002 (Year: 2007).*

Khan, Adnan Afsar, and Hussein T. Mouftah. "Web services for indoor energy management in a smart grid environment." 2011 IEEE 22nd International Symposium on Personal, Indoor and Mobile Radio Communications. IEEE, 2011.pp. 1036-1040 (Year: 2011).*

Yeager, Daniel J., et al. "Wirelessly-charged UHF tags for sensor data collection." 2008 IEEE International Conference on RFID. IEEE, 2008.pp. 1-9 (Year: 2008).*

English Abstract for CN101393451, Total of 1 page.
English Abstract for CN103621107, Total of 1 page.
English Abstract for CN103676819, Total of 1 page.
English Abstract for TW201241630, Total of 1 page.
English Abstract for TWI451096, Total of 1 page.
English Abstract for TWM441805, Total of 1 page.
English Abstract for TWM452554, Total of 1 page.

* cited by examiner

METHOD OF MANAGING ENERGY CONSUMPTION

The current application claims a foreign priority to application number 104122338 filed on Jul. 9, 2015 in Taiwan.

BACKGROUND OF THE INVENTION

1. Technical Field

The present invention relates generally to a wireless control system, and more particularly to a method of managing energy consumption applied to a wireless control system.

2. Description of Related Art

In pursuit of a convenient lifestyle, people tend to use more and more home appliances, and therefore unintentional energy consumption may happen all the time, which consequently increases carbon emission.

In recent years, energy saving and carbon reduction have become one of the most concerned international issues due to the worsening global warming problem, and people start to take some daily actions, as frequently advocated by governments, to conserve more energy. Such actions include turning off lights when leaving, setting the temperature of air conditioners above 28 degrees Celsius, installing a water saving valve on a faucet, using a thermostatic gas water heater, and so on. However, people would not know the amount of energy consumption and the effects of taking certain means of energy conservation before receiving a utility bill. In this sense, conserving energy with such a passive way is ineffective.

BRIEF SUMMARY OF THE INVENTION

In view of the above, the primary objective of the present invention is to provide a method of managing energy consumption, which consumes less energy when the amount of energy consumption in an energy monitoring period exceeds a predetermined threshold.

The present invention provides a method of managing energy consumption which is applied to a wireless control system, wherein the wireless control system includes a plurality of appliances and a relay device which wirelessly communicates with the plurality of appliances. Each of the plurality of the appliances is controllable by a control command sent from the relay device to change an operational status thereof. The method of managing energy consumption includes the steps of: A. obtaining an amount of energy consumption from a start time point to a predetermined time point in an energy monitoring period of each of the plurality of appliances; B. comparing the amount of energy consumption with a second threshold during the energy monitoring period, which is lower than a first threshold; and C. determining whether an energy conservation mode starts when the amount of energy consumption exceeds the second threshold. If the energy conservation mode starts, the relay device sends an energy conservation command to at least one of the plurality of appliances to control said at least one appliance to consume less energy.

Whereby, if the energy conservation mode starts, the energy consumed by the appliances would be reduced without cutting off the energy supply of the appliances. In this way, the appliances can still work under an acceptable level of energy consumption to achieve the objective of energy conservation.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
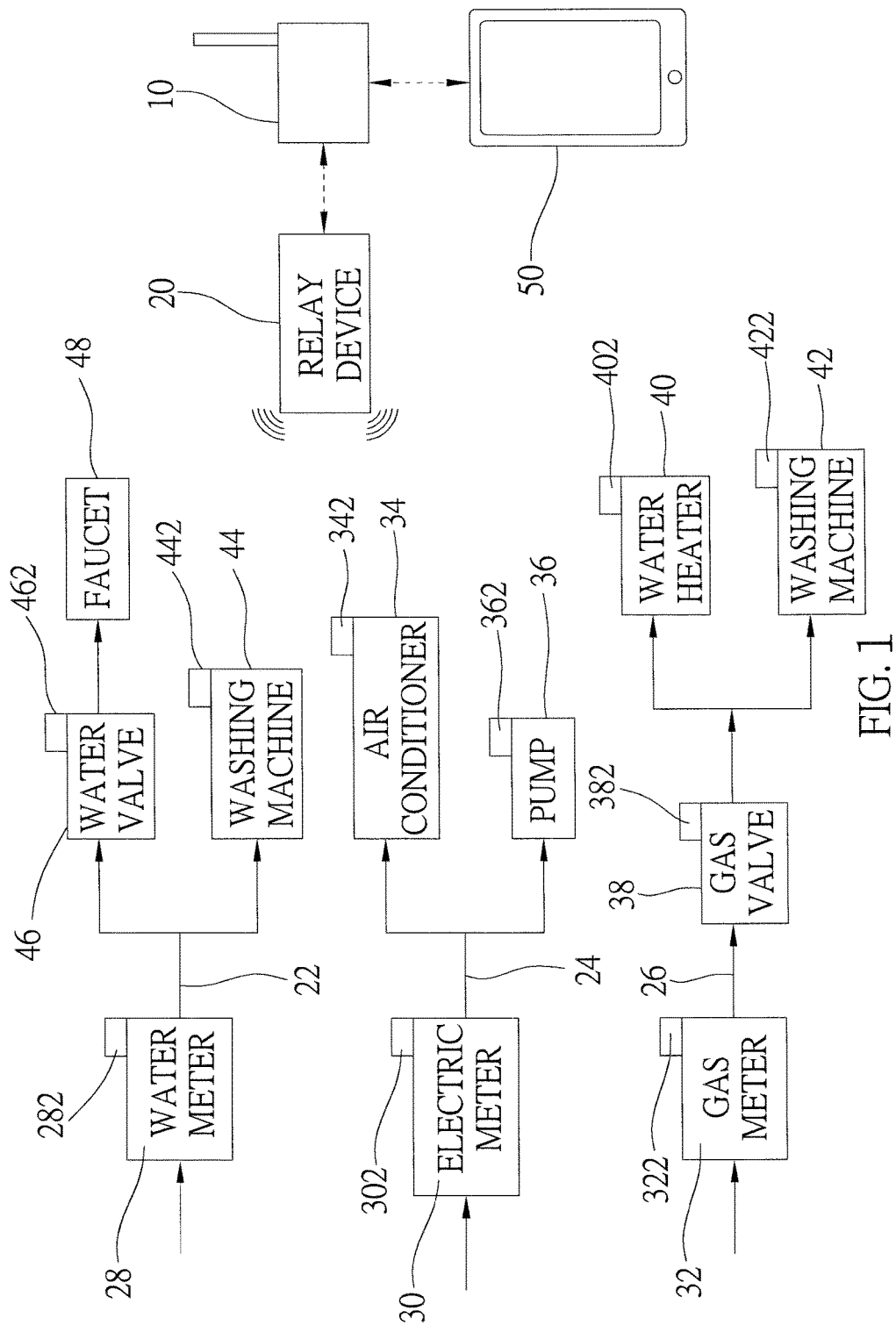
FIG. 1 is a block diagram of the wireless control system to which a preferred embodiment of the present invention is applied.

As shown in FIG. 1, a wireless control system to which a preferred embodiment of the present invention, a method of managing energy consumption, is applied includes an Access Point (AP) 10, a relay device 20, a plurality of appliances, and an electronic device 50.

Figure 2:
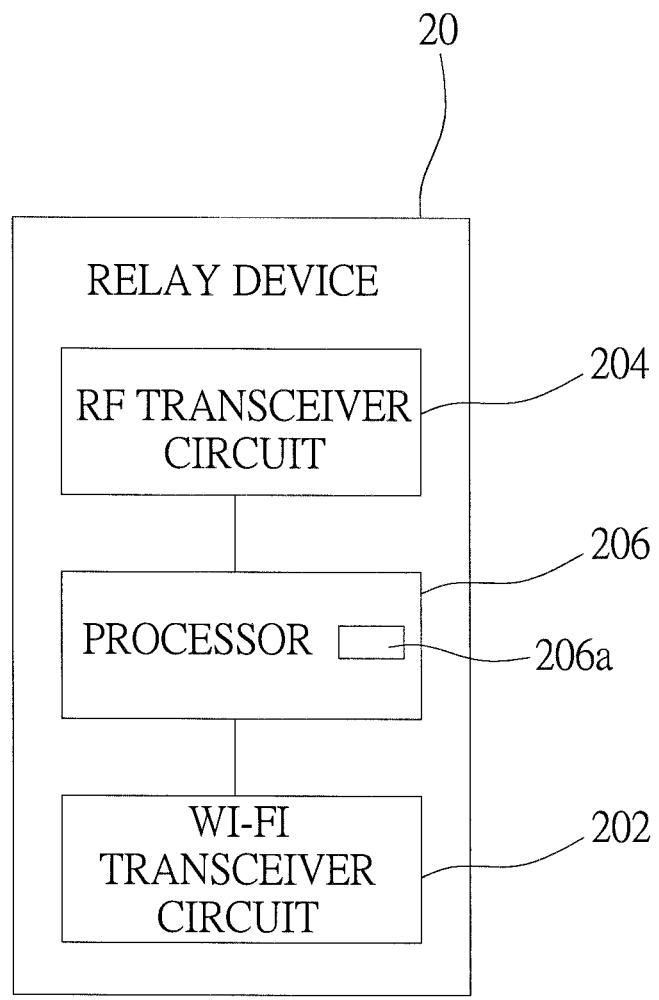
FIG. 2 is a block diagram of the relay device of the wireless control system illustrated in FIG. 1.

The AP 10 is connected to an Internet (not shown), and serves as an intermediate point in a wireless local area network. As shown in FIG. 2, the relay device 20 includes a Wi-Fi transceiver circuit 202, a Radio Frequency (RF) transceiver circuit 204, and a processor 206. The Wi-Fi transceiver circuit 202 communicates with the AP 10, the RF transceiver circuit 204 communicates with the appliances through RF signals; the processor 206 bi-directionally converts Wi-Fi signals into and from RF signals. In this way, the relay device 20 could receive a Wi-Fi signal having a control command, convert the Wi-Fi signal into an RF signal having the control command, and then transmit the RF signal to the appliances.

In the preferred embodiment, the so called energy includes water, electricity, and gas. Additionally, a water meter 28, an electric meter 30, and a gas meter 32 are respectively connected to source ends of a water pipe 22, a power line 24, and a gas pipe 26 to monitor the consumption of the respective energy. The water meter 28, the electric meter 30, and the gas meter 32 respectively have RF transceiver circuits 282, 302, and 322, wherein the RF transceiver circuits 282, 302, and 322 communicate with the RF transceiver circuit 204 of the relay device 20. Accordingly, the water meter 28, the electric meter 30, and the gas meter 32 respectively receive RF signals having retrieval commands from the relay device 20, and then transmit readings on the water meter 28, the electric meter 30, and the gas meter 32 back to the relay device 20.

Accordingly, the appliances are divided into three types, electric appliances, gas appliances, and water appliances, in the preferred embodiment.

The electric appliances include an air conditioner 34 and a pump 36 which are connected to the power line 24. The air conditioner 34 has an RF transceiver circuit 342 to communicate with the relay device 20. Specifically, the air conditioner 34 receives a control command from the relay device 20 to regulate an indoor temperature, and to transmit an operational status thereof (a current temperature) to the relay device 20. Similarly, the pump 36 has an RF transceiver circuit 362 to communicate with the relay device 20, wherein the pump 36 receives a control command from the relay device 20 to be switched on or off, and to transmit an operational status thereof to the relay device 20 as well.

The gas appliances include a gas valve 38, a water heater 40, and a fireplace 42, wherein the gas valve 38 is installed on the gas pipe 26 which communicates with the water heater 40 and the fireplace 42. The gas valve 38, the water heater 40, and the fireplace 42 respectively have RF transceiver circuits 382, 402, and 422 to communicate with the relay device 20. Specifically, the gas valve 38 receives a control command from the relay device 20 to provide or cut off a gas flow to the water heater 40 and the fireplace 42. The water heater 40 receives a control command from the relay device 20 to set an output temperature when heating, and to transmit an operational status thereof to the relay device 20. Similarly, the fireplace 42 receives a control command from the relay device 20 to be switched on or off, to adjust a fire power to regulate an indoor temperature, and to transmit an operational status thereof (e.g., on or off, a degree of fire power, and an indoor temperature) to the relay device 20.

The water appliances include a washing machine 44, a water valve 46, and a faucet 48. The washing machine 44 has an RF transceiver circuit 442 to communicate with the relay device 20. In details, the washing machine 44 receives a control command from the relay device 20 to start a laundry procedure, and to transmit an operational status thereof (e.g., on or off, and a laundry stage) to the relay device 20. The water valve 46 is disposed between the faucet 48 and the water meter 28, and also has an RF transceiver circuit 462 to communicate with the relay device 20. The water valve 46 receives a control command from the relay device 20 to adjust a water flow flowing therethrough, and to transmit an operational status (e.g., the extent of openness of an opening through which the water flow flows) to the relay device 20. The faucet 48 is controllable by users to allow water flowing out.

The electronic device 50 includes a Tablet PC in the preferred embodiment, wherein the electronic device 50 is connected to the AP 10 through Wi-Fi signals or the Internet. A user executes an application through the electronic device 50 to control the appliances, wherein control commands which control the appliances are transmitted from the AP 10 to the relay device 20 through Wi-Fi signals, and the relay device 20 converts the Wi-Fi signals into RF signals to be transmitted to a designated appliance. In addition, the relay device 20 converts the operational status of the appliances into Wi-Fi signals, and transmits the Wi-Fi signals to the electronic device 50 for displaying and performing subsequent processing.

Figure 3:
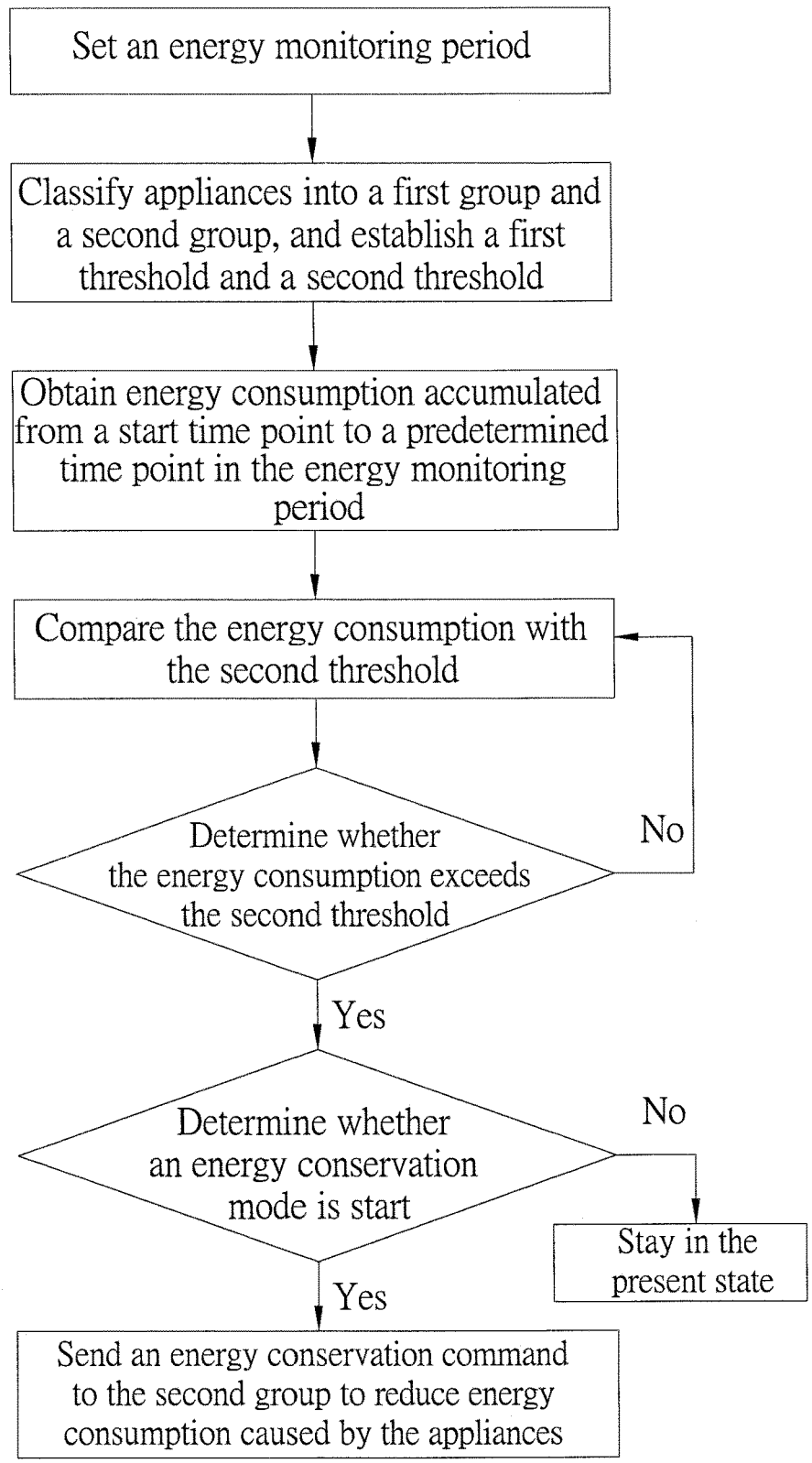
FIG. 3 is a flow chart of the preferred embodiment of the present invention.

With the abovementioned structure, the method of managing energy consumption illustrated in FIG. 3 can be applied.

In the first place, set a plurality of energy monitoring periods according to the type of energy. In the preferred embodiment, the energy monitoring periods are billing cycles of water, electricity, and gas. In general, a starting date of each of the billing cycles is different from the others. Herein we take electricity as an example for explaining the method of managing energy consumption.

The electric appliances are classified into a plurality of groups including a first group and a second group, wherein the appliances in the first group are unsuitable for energy conservation (such as the pump 36); therefore, the relay device 20 would not send an energy conservation command to the appliances in the first group, and thus such appliances would not be controlled to consume less energy. On the other hand, the appliances in the second group are suitable for energy conservation (such as the air conditioner 34); therefore, when the appliances are in an energy conservation mode, they are controlled by the energy conservation command to consume less energy. The classification of the appliances could be set by the user through the electronic device 50, or could be done by a manufacturer of the wireless control system in advance. The classification of each of the appliances is stored in a memory 206a in the relay device 20.

The next step is to establish a first electricity threshold and a second electricity threshold in the memory 206a, wherein the first electricity threshold is set by the user through the electronic device 50 in the preferred embodiment, and is stored in a memory 206a in advance. In another preferred embodiment, the first electricity threshold may reflect an actual amount of energy consumption during another energy monitoring period before the starting date, for example, an actual amount of energy consumption during an energy monitoring period of a prior billing cycle, or an actual amount of energy consumption during an date period in the last year equivalent to the energy monitoring period. Moreover, the first electricity threshold could be obtained from an external database (e.g., a database of an electric power company) which is connected to the relay device 20 via the Internet through the AP 10. The second electricity threshold is set by the user, and is lower than the first electricity threshold, wherein the second electricity threshold could be a predetermined percentage, say 70 percent for example, of the first electricity threshold.

From a start time point in the energy monitoring period, the relay device 20 sends a retrieval command to the electric meter 30 once in a while, which commands the electric meter 30 to report a reading to the relay device 20. The reading is stored in the memory 206a of the relay device 20 to obtain an amount of electric energy consumption of the electric appliances and other types of appliances which also consume electric power. The relay device 20 calculates and obtains an amount of electric energy consumption accumulated from the start time point to a predetermined time point. In the preferred embodiment, the start time point is a time point when the energy monitoring period starts; the predetermined time point is the last time when the retrieval command is send, but this is not a limitation of the present invention. In another preferred embodiment, the start time point and the predetermined time point may be any time points within the energy monitoring period, which are set by the user through the electronic device 50, and are stored in the memory 206a of the relay device 20.

The processor 206 of the relay device 20 compares the amount of electric energy consumption with the second electricity threshold to see whether the amount of electric energy consumption exceeds the second electricity threshold or not. If the amount of electric energy consumption exceeds the second electricity threshold, the relay device 20 would send a notifying message to the electronic device 50 for the user to determine whether to start an energy conservation mode. Whereby, if the amount of electric energy consumption exceeds the second electricity threshold, the user would be notified instantly.

Afterwards, if the user determines not to start the energy conservation mode, the energy consumed by the appliances would not be regulated through the relay device 20. On the other hand, if the user determines to start the energy conservation mode through the electronic device 50, the electronic device 50 would send an energy conservation mode command to the relay device 20. The relay device 20 sends an energy conservation command to the appliances in the second group upon receiving the energy conservation mode command to narrow controllable ranges of parameters of the appliances. For example, in the preferred embodiment, before the air conditioner 34 receiving the energy conservation command (i.e., before the energy conservation mode starts), a controllable range of an air conditioning temperature is 17-31 degree Celsius; when the air conditioning temperature is adjusted to the lowest temperature (17 degree Celsius), the maximum power the air conditioner 34 could consume is defined as a first power. In contrast, after the air conditioner 34 receiving the energy conservation command, the controllable range of the air conditioning temperature thereof would be narrowed, say 28-31 degree Celsius for example. Similarly, when the air conditioning temperature is adjusted to 28 degree Celsius, the maximum power the air conditioner 34 could consume is defined as a second power, wherein the second power is apparently lower than the first power. Whereby, when the amount of electric energy consumption exceeds the second electricity threshold, the electric energy consumed by the air conditioner 34 would be afterward lowered in a user acceptable range of the air conditioning temperature to prevent the amount of electric energy consumption from exceeding the first electricity threshold. Specifically, in the preferred embodiment, while in the energy conservation mode, the appliance is controlled to consume less energy rather than being switched off. In this way, the user could still use the appliance in an energy conservation way.

The method of managing energy consumption explained above is applied to the electric appliances. However, the concept can be also applied to the gas appliances. In more details, the gas appliances are also classified into a first group and a second group in the beginning, wherein the gas appliance in the first group is the gas valve 38, and the gas appliances in the second group are the water heater 40 and the fireplace 42. Next, a first gas threshold and a second gas threshold for gas energy consumption are stored in the memory 206a of the relay device 20 as well. The first gas threshold and the second gas threshold of the gas appliances are set in a similar way to that of the electric appliances, and therefore it is not described in detail herein.

From a start time point to a predetermined time point in an energy monitoring period for gas energy, the relay device 20 retrieves a reading on the gas meter 32 once in a while to obtain an amount of gas energy consumption accumulated from the start time point to a predetermined time point.

The processor 206 of the relay device 20 compares the amount of gas energy consumption with the second gas threshold, and determines whether the amount of gas energy consumption exceeds the second gas threshold. If the amount of gas energy consumption exceeds the second gas threshold, the relay device 20 sends a notifying message to the electronic device 50 for the user to determine whether to start an energy conservation mode.

Similarly, if the energy conservation mode starts, the relay device 20 would send an energy conservation command to the appliances in the second group, i.e., the water heater 40 and the fireplace 42, to narrow controllable ranges of parameters of the appliances. For example, before the water heater 40 receiving the energy conservation command, a controllable range of a water output temperature is 32-70 degree Celsius; when the water output temperature is adjusted to the highest temperature (i.e., 70 degree Celsius), the maximum thermal energy which can be generated by the water heater 40 is defined as a first thermal energy value. In contrast, after the water heater 40 receiving the energy conservation command, the controllable range of the water output temperature thereof would be narrowed; for example, when the highest temperature is restricted to 42 degree Celsius, the maximum thermal energy which can be generated by the water heater 40 is defined as a second thermal energy value, wherein the second thermal energy value is apparently lower than the first thermal energy value. Whereby, the water heater 40 would be controlled to consume less gas rather than being switched off.

Of course, the concept of the method of managing energy consumption can be applied to the water appliances, too. First, the water appliances are also classified into a first group and a second group, wherein the water appliance in the first group is the washing machine 44, and the water appliance in the second group is a water valve 46. Next, a first water threshold and a second water threshold for water energy consumption are stored in the memory 206a of the relay device 20 as well. The s first water threshold and the second water threshold are set in a similar way to that of the electric appliances and the gas appliances, and therefore it is not described in detail herein.

From a start time point to a predetermined time point in an energy monitoring period for water, the relay device 20 retrieves a reading on the water meter 28 once in a while to obtain an amount of water energy consumption accumulated from the start time point to a predetermined time point.

The processor 206 of the relay device 20 compares the amount of water energy consumption with the second water threshold to see whether the amount of water energy consumption exceeds the second water threshold. If the amount of water energy consumption exceeds the second water threshold, the relay device 20 sends a notifying message to the electronic device 50 for the user to determine whether to start an energy conservation mode.

Again, if the energy conservation mode starts, the relay device 20 would send an energy conservation command to the water appliance in the second group, i.e., the water valve 46, to narrow controllable ranges of parameters of the appliance. For example, before the water valve 46 receiving the energy conservation command, a maximum water flow which is allowed to flow through the water valve 46 is defined as a first water flow. In contrast, after the energy conservation mode starts, a controllable range of the water flow of the water valve 46 would be narrowed, and in such state, a maximum water flow which is allowed to flow through the water valve 46 is defined as a second water flow, wherein the second water flow is lower than the first water flow. Whereby, the water valve 46 would consume less water by restricting the water flow which is allowed to flow through the water valve 46, and the water valve 46 would not necessary to be completely turned off. In this way, the user could still use water in an energy conservation way.

In conclusion, after comparing the amount of energy consumption with the second threshold in each of different types of energy, the processor 206 determines whether an energy conservation mode starts. When the energy conservation mode starts, the energy consumed by the appliances would be reduced without the need to really stop the energy supply. Whereby, the appliances can still operate even in the energy conservation mode.

It must be pointed out that the embodiments described above are only some preferred embodiments of the present invention. All equivalent methods which employ the concepts disclosed in this specification and the appended claims should fall within the scope of the present invention.

What is claimed is:

1. A method of managing energy consumption which is applied to a wireless control system, wherein the wireless control system comprises a plurality of appliances and a relay device which wirelessly communicates with the plurality of appliances; the plurality of appliances are respectively connected to at least one meter which is adapted to monitor energy consumption of each of the plurality of appliances and could wirelessly communicate with the relay device; each of the plurality of the appliances is controllable by a control command sent from the relay device to change a operational status thereof, comprising the steps of:

A. classifying the plurality of appliances into a plurality of groups, wherein the plurality of groups comprise a first group and a second group; the relay device does not send the energy conservation command to the appliances in the first group no matter whether an energy conservation mode starts or not, while the relay device sends the energy conservation command to the appliances in the second group when the energy conservation mode starts;

B. obtaining an amount of energy consumption from a start time point to a predetermined time point in an energy monitoring period of each of the plurality of appliances from the at least one meter with the relay device;

C. comparing the amount of energy consumption with a second threshold during the energy monitoring period, which is lower than a first threshold with the relay device; and D. determining whether the energy conservation mode starts when the amount of energy consumption exceeds the second threshold with the relay device, wherein if the energy conservation mode starts, the relay device sends an energy conservation command to at least one of the plurality of appliances to control said at least one appliance to consume less energy; wherein the plurality of appliances comprise a gas appliance; before receiving the energy conservation command, a thermal energy generated by the gas appliance does not exceed a first thermal energy value; if the energy conservation mode starts, the relay device sends the energy conservation command to the gas appliance to narrow a controllable range of a parameter of the gas appliance, and the thermal energy generated by the gas appliance does not exceed a second thermal energy value, wherein the second thermal energy value is lower than the first thermal energy value but not zero.

2. The method of claim 1, wherein the first threshold reflects an actual amount of energy consumption in another energy monitoring period.

3. The method of claim 1, wherein the first threshold and the second threshold are set by a user.

4. The method of claim 1, wherein the plurality of appliances comprise an electric appliance; before receiving the energy conservation command, the electric appliance consumes no more than a first power; if the energy conservation mode starts, the relay device sends the energy conservation command to the electric appliance to narrow a controllable range of a parameter of the electric appliance, and the electric appliance consumes no much than a second power, wherein the second power is lower than the first power.

5. The method of claim 1, wherein the at least one appliance which receives the energy conservation command is controlled to consume less energy without being turned off.

6. A method of managing energy consumption which is applied to a wireless control system, wherein the wireless control system comprises a plurality of appliances and a relay device which wirelessly communicates with the plurality of appliances; the plurality of appliances are respectively connected to at least one meter which is adapted to monitor energy consumption of each of the plurality of appliances and could wirelessly communicate with the relay device; each of the plurality of the appliances is controllable by a control command sent from the relay device to change a operational status thereof, comprising the steps of:

A. classifying the plurality of appliances into a plurality of groups, wherein the plurality of groups comprise a first group and a second group; the relay device does not send the energy conservation command to the appliances in the first group no matter whether an energy conservation mode starts or not, while the relay device sends the energy conservation command to the appliances in the second group when the energy conservation mode starts;

B. obtaining an amount of energy consumption from a start time point to a predetermined time point in an energy monitoring period of each of the plurality of appliances from the at least one meter with the relay device;

C. comparing the amount of energy consumption with a second threshold during the energy monitoring period, which is lower than a first threshold with the relay device; and D. determining whether the energy conservation mode starts when the amount of energy consumption exceeds the second threshold with the relay device, wherein if the energy conservation mode starts, the relay device sends an energy conservation command to at least one of the plurality of appliances to control said at least one appliance to consume less energy; the plurality of appliances comprise a water valve; before receiving the energy conservation command, a maximum water flow allowed to flow through the water valve is defined as a first water flow; if the energy conservation mode starts, the relay device sends the energy conservation command to the water valve to narrow a controllable range of a parameter of the water valve, and the maximum water flow allowed to flow through the water valve is defined as a second water flow, wherein the second water flow is lower than the first water flow but not zero.

* * * * *